Fig. 2

S. T. INGRAM.
TRACTOR ROTARY PLOW.
APPLICATION FILED NOV. 23, 1918.

1,342,815.

Patented June 8, 1920.
6 SHEETS—SHEET 5.

Fig. 7

S. T. Ingram, INVENTOR.
BY Hugh N. Wagner, ATTORNEY.

Fig. 8

UNITED STATES PATENT OFFICE.

SLEEPER T. INGRAM, OF ST. LOUIS, MISSOURI, ASSIGNOR OF THIRTY PER CENT. TO JAMES E. NEWELL, OF ST. LOUIS, MISSOURI.

TRACTOR ROTARY PLOW.

1,342,815. Specification of Letters Patent. Patented June 8, 1920.

Application filed November 23, 1918. Serial No. 263,866.

*To all whom it may concern:*

Be it known that I, SLEEPER T. INGRAM, a citizen of the United States, residing at the city of St. Louis, in the State of Missouri, have invented certain new and useful Improvements in Tractor Rotary Plows, of which the following is a specification.

This invention is a farm soil pulverizer, which may be used as and in lieu of a plow, harrow, and cultivator. All these operations can be performed by this one machine.

One of the detrimental features or agriculture, as commonly practised, is the practice of shallow plowing. Deep plowing is harder work for man and beast. The tendency is, therefore, for hired hands and even for farmers not to plow so thoroughly, i. e., deeply, as will be adequate or preferable for good or the best crops.

The depth that is proper for plowing depends upon the nature of the crop to be raised, the character of the soil, the amount of moisture, and other circumstances. In general, increased depth of plowing will result in improvement in the quality and quantity of the crop. In no instance, of course, should the plowing be so deep as to extend through the soil so as to mix therewith the underlying stratum.

The work of harrowing is laborious and takes additional time and labor, because, according to present practice, the same follows the plowing.

The quality and quantity of the crop raised depends largely, in crops that need cultivation, upon the frequency and thoroughness of the cultivation, the necessity for which occurs at a time when a farmer is likely to be otherwise busy, and which, in any case, is so arduous as to be often slighted by employees and lazy farmers.

The machine of this invention is adapted thoroughly to pulverize the soil and thus to combine plowing and harrowing, performing both operations at the same time and with much greater efficiency and thoroughness than ordinary plowing and harrowing.

Moreover, without extra labor, the plowing may be made as deep as desired, going down even as far as the thickness of the stratum of soil. The depth of plowing by this machine can be regulated at will, and deep plowing can be performed with as great facility and ease as mere surface plowing, the entire operation being carried on by power supplied by any suitable engine or motor, which engine or motor preferably forms an integral part of this machine and may be of the internal combustion type, as indicated in the drawings, or may be adapted to be operated by any other suitable motive power.

Furthermore, this machine is adapted to cultivate the soil while moving with considerable rapidity along the rows of standing grain or the like, its wheels passing down between two rows of the crop and its middle miller stirring the soil in the intermediate row. In its next trip across the field, which will ordinarily be in the opposite direction, one of its wheels will roll over the row just cultivated on the last preceding trip, and, in that way, will tamp the earth and cause it to retain its moisture. This is beneficial to the crop.

The pulverization of the soil accomplished by this machine, in lieu of plowing and harrowing, can be much more quickly accomplished than either the plowing or the harrowing, and, as it takes the place of the combination of both, greater saving of time and labor is obviously effected thereby, resulting, for one thing, in making it possible greatly to increase the acreage planted. As cultivation by this machine is more rapid than by present methods, it is possible, also, to cultivate a larger acreage.

This machine can be made in sizes especially suitable for different crops, and, while in the drawings it is shown with three millers, it can be constructed also with a greater or less number thereof.

Its engine can be used for driving a threshing machine, saw-mill, feed-cutter, or other farm implements, and, as a whole, can be used like a tractor for moving the crops from the field to the crib or to a railway station, its use as a tractor being made possible by its construction that enables the lifting of the millers out of the ground and to any desired height above it.

In the accompanying drawings forming part of this specification, in which like numbers of reference denote like parts wherever they occur.

The engine 1 is mounted upon the frame 2, which incloses the tractor wheels 3 and the millers 4, 5, and 6. Journals 7, mounted on opposite sides of frame 2, provide bearings for shaft 8 for the wheels 3 and gears 9, the said gears being fixed to wheels 3, and wheels 3 to shaft 8.

The means of attachment of engine 1 to frame 2 is preferably by flat-irons or other supports 10 attached thereto by bolts 11 and at their other end by bolts 12 to brackets 13.

A guide-wheel 14 is journaled at 15 in upright 16, which supports the forward end of frame 2 and the engine 1.

A shaft 17 is driven by engine 1 and communicates power to differential 18, which drives gears 9 and thereby wheels 3.

Sprocket-wheel 19 is fixed to shaft 17, and, by means of sprocket-chain 20, drives sprocket-wheel 21 fixed to shaft 22. Shaft 22 is connected by a universal joint 23 to a worm 24 that actuates worm wheel 25 fixed to shaft 26 on which gear 27 is mounted and which bears miller 6. Bolts 28 attach gear 27 to worm wheel 25.

The shaft 22 is supported by means of a bearing 22ª, which is integral with the hub 29.

The brackets 13 project from the central axle journal or support 29, as do also the brackets 30 which support the bracket-extensions 31, and thereby the bracket 32 which has the legs 33 which are fastened by screws to the cross-frame member 34 fastened by angles 35 to the horizontal part of frame 2. Thus from cross-frame member 34 to the rounded front part of frame 2 extends a skeleton support, not only for engine 1, but also through the member 29 for the shaft 8 which forms the axle for the tractor wheels 3, and also forms a support for the differential 18 and the drive shafts 36, on which are fixed the pinions 37 in engagement with and adapted to drive the gears 9. Gears 9 are fastened by screws 38 to the spokes 39 of the tractor wheels 3, whereby the same are driven by the rotation of gears 9. Drums 40 are fixed to shaft 36 and are each provided with a brake-band 41 adapted to be operated by brake-rods 42, which brake-rods 42 extend to any convenient point adjacent either to the foot or to the hand of the operator. Arms 44 are pivotally mounted upon axle 8. The heads 45 are pierced for the passage therethrough of shafts 26, 46, and 47 respectively and underlie gears 27, 48, and 49, and prevent the said gears from dropping off the lower ends of their respective shafts on which the same are splined or slidingly keyed. Worm wheel 25 is similarly splined on shaft 26.

Figure 1:
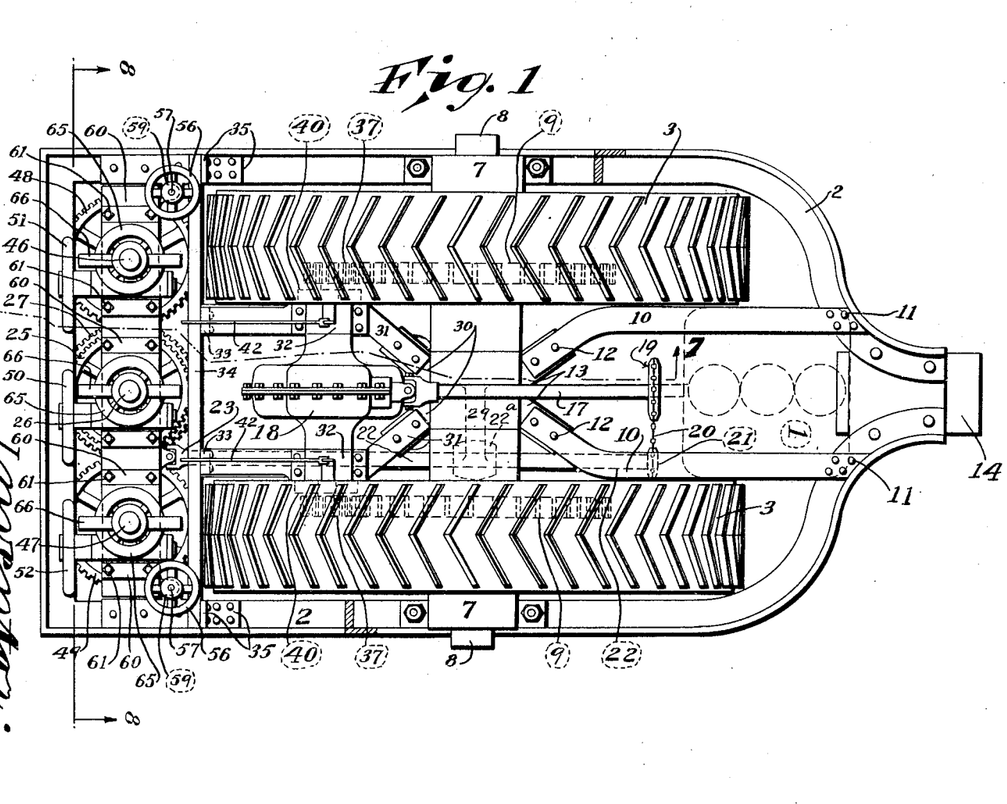
Figure 1 is a top plan view.
Figure 2:
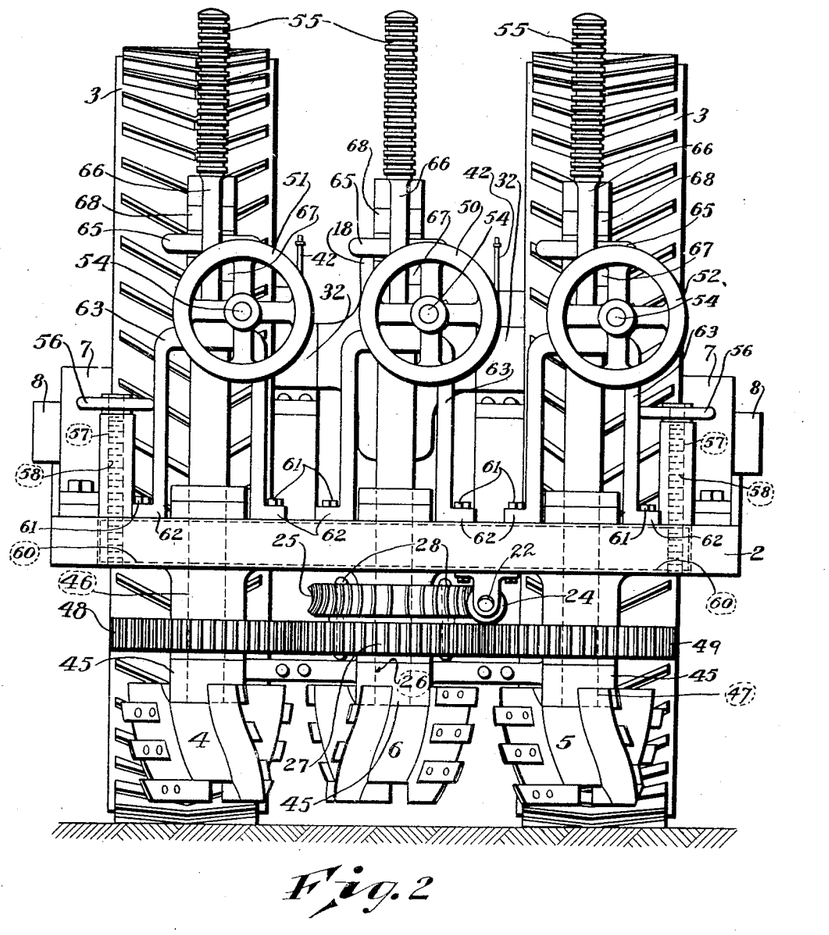
Fig. 2 is an end elevation looking from the left in Fig. 1.
Figures 3, 4, 5:
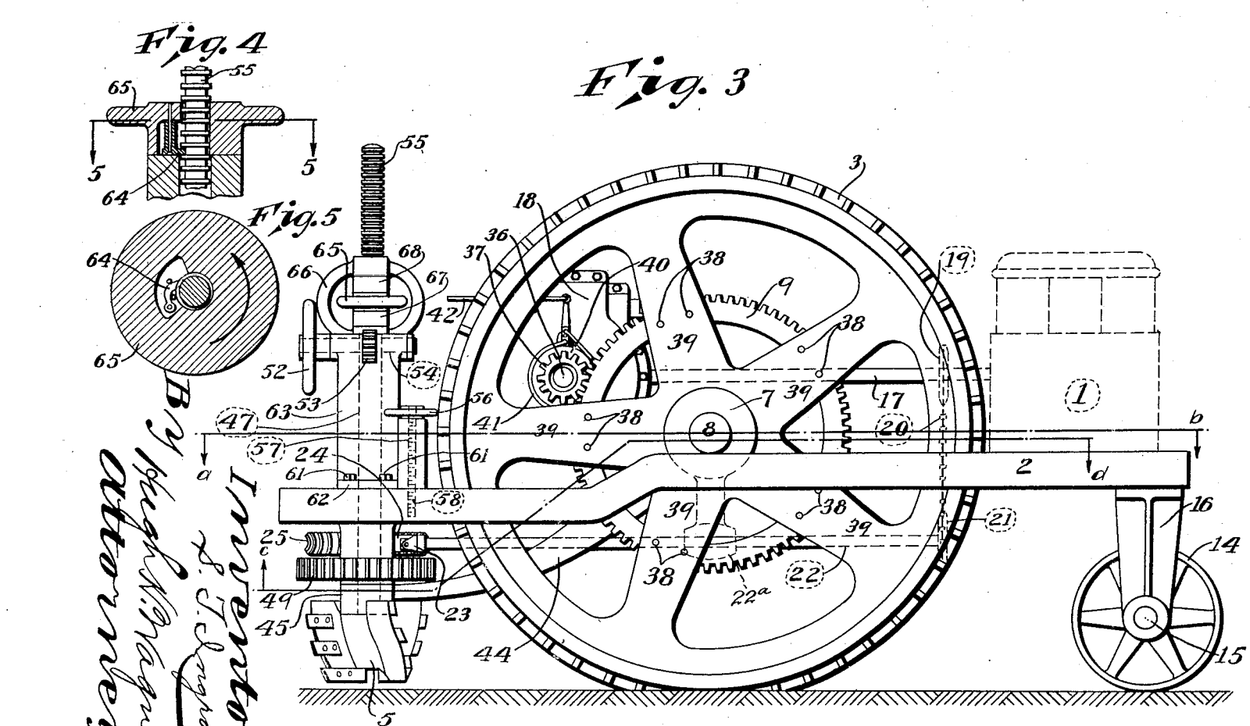
Fig. 3 is a side elevation.
Fig. 4 is a sectional view of the locknut.
Fig. 5 is a sectional view on the line 5—5 in Fig. 4, looking in the direction indicated by the arrows.
Figure 6:
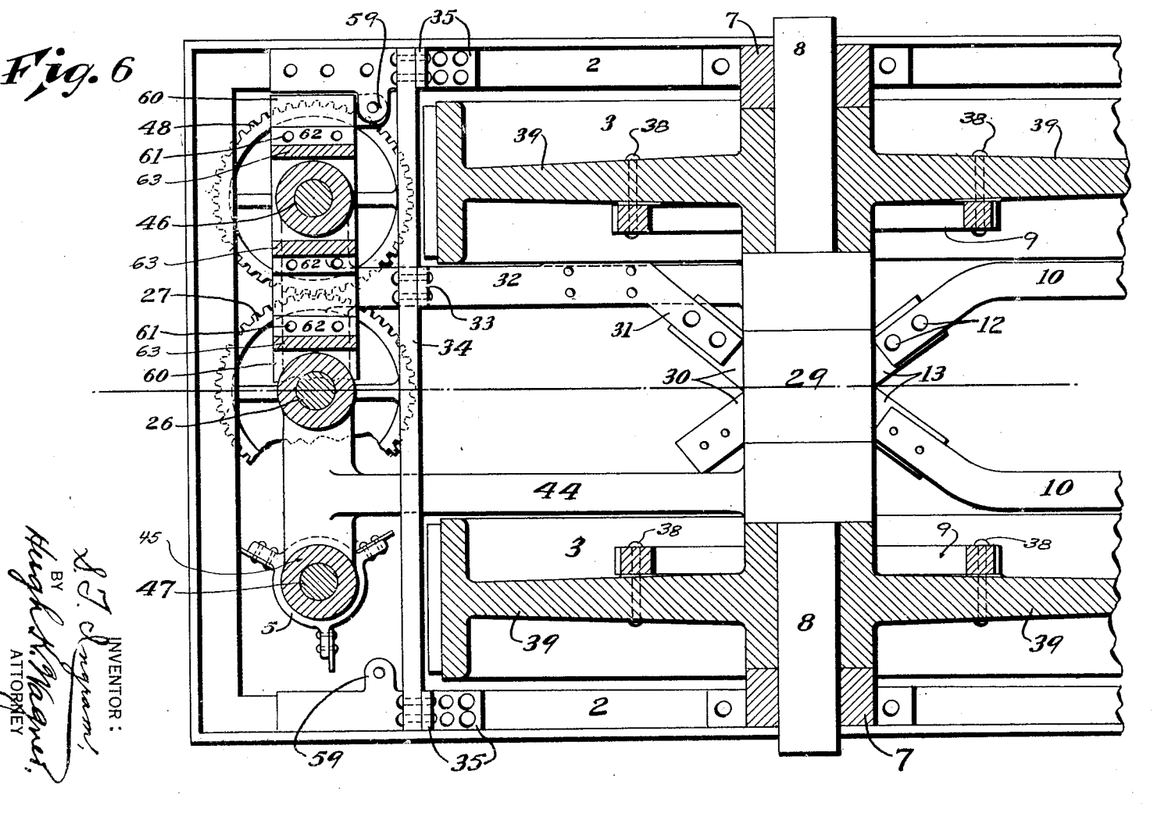
Fig. 6 is a sectional plan view, of which the upper half is taken approximately on the line a—b and the lower half approximately on the line c—d in Fig. 3.
Figure 7:
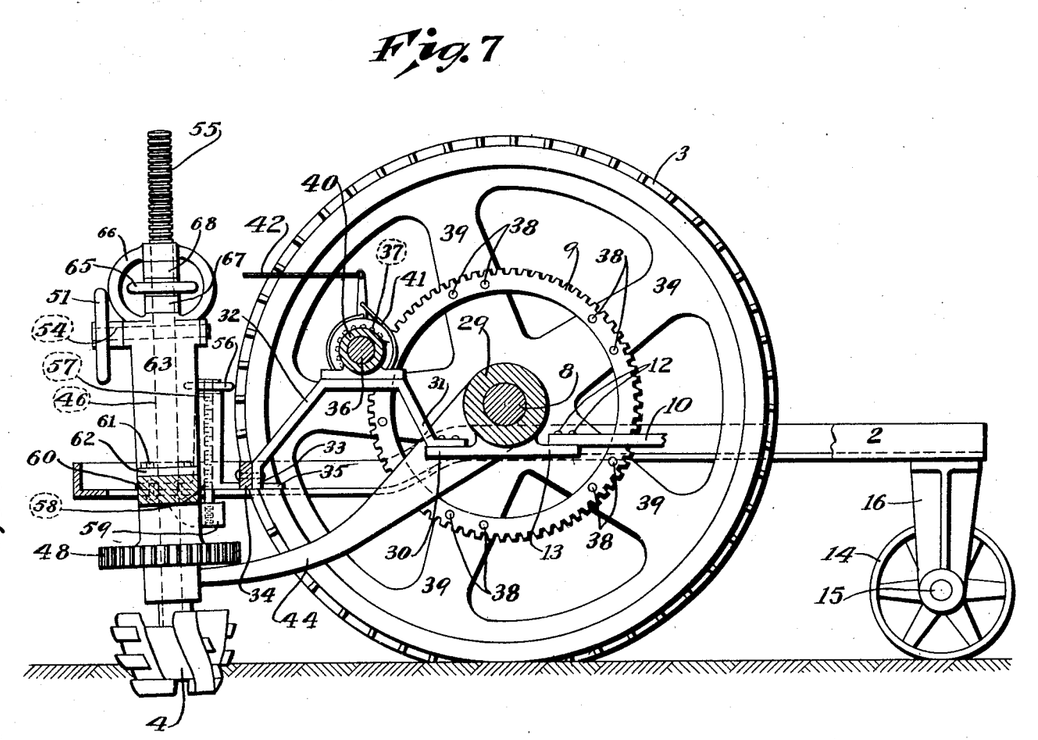
Fig. 7 is a sectional elevation taken on the line 7—7 in Fig. 1.
Figure 8:
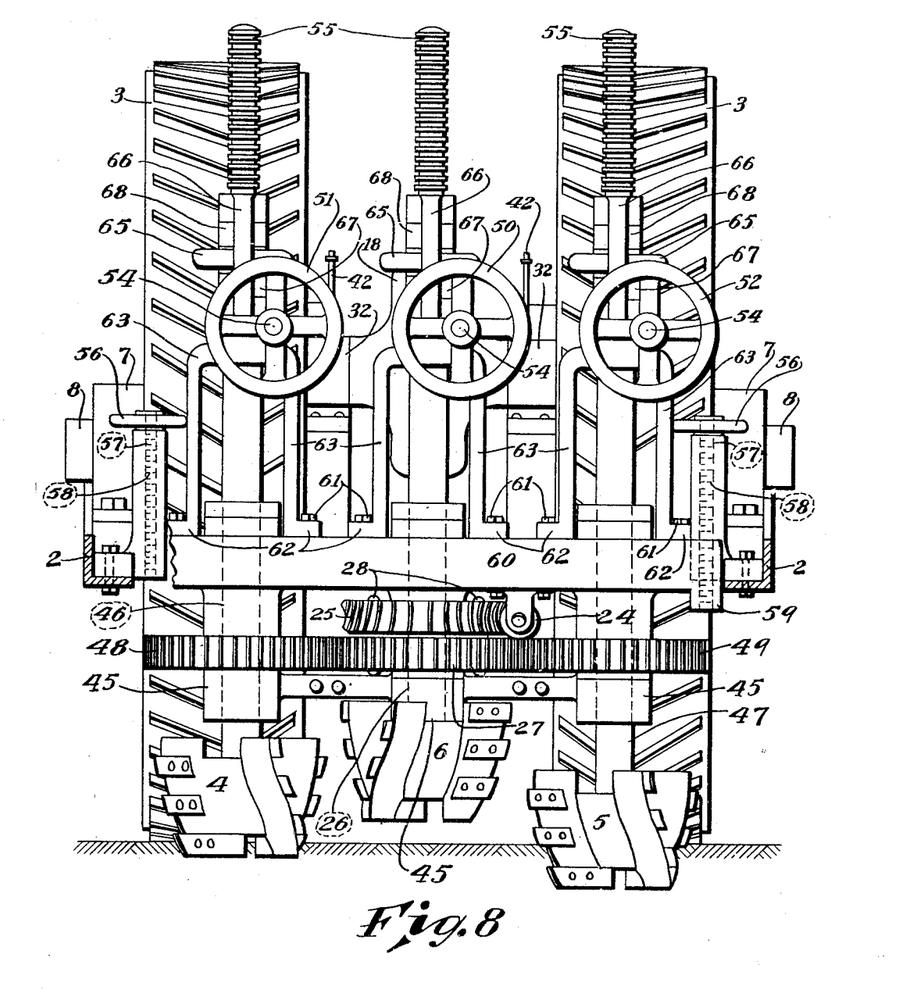
Fig. 8 is a section taken on the line 8—8 in Fig. 1.

Millers or cutter-heads 4, 5, and 6 are fixed to the lower ends of shafts 46, 47, and 26 respectively, and, as shown in Fig. 2, by the elevation of miller 6, are capable of a certain amount of elevation above the ground by the turning of hand-wheel 50 (for miller 6) and hand-wheels 51 and 52 (for millers 4 and 5), respectively. As best seen in Fig. 3, the rotation of hand-wheel 52, or 51, or 50, rotates pinion 53 mounted on short shaft 54 which pinion 53 engages the notches in the grooved part 55 in the shafts 47, 46, and 26 respectively, and thereby causes the shaft with which it is in engagement to move vertically upward or downward, carrying with it its attached cutter-head or miller.

Vertical movement of the millers 4, 5, and 6 as a bank, that is to say, at one time, can be produced by operating hand-wheels 56 which rotate screw-threaded shafts 57, which are suitably mounted (preferably in a swiveled manner not shown) so as to coöperate with screw-threads 58 in frame 2 and extending into a lug 59, of which there are two or more projecting from frame 60. Bolts 61 attach frame 60 to the flanges 62 at the bottom of brackets 63 that house shafts 26, 46, and 47. Because of the connection between pinions 53 and the grooves 55 in their respective shafts, and because of the connection by bolts 61 between housing or sleeve 63 that carries shaft 54 and pinion 53 and the hand-wheel 51 or 52 to operate the same, movement of frame 60 by means of hand-wheel 56, screw-threaded shaft 57, the screw-threads 58 in frame 2 and the attachment of the lower end of shaft 57 to frame 60, results in movement of the shafts 26, 46, and 47 in a bank, that is to say, at one time. Since such movement is limited by the grip of the heads 45 of forked-arm 44 upon the said shafts, such movement on their part will necessarily describe an arc of a circle, so that if depressed they will be tilted in such manner that the millers 4, 5, and 6 will be moved forward in Fig. 3. On the other hand, if elevated, the said millers will be moved to the left in Fig. 3, in this position for instance, being elevated above the ground, so as to travel home, or to work, or for use as a tractor.

To prevent the vertical shafts 26, 46, and 47 falling by gravity, the grooves 55 merely idly turning the pinions 53, a lock consisting of a pawl 64 operated by the hand-wheel 65 is provided for each of the said vertical shafts. Pawl 64 fits into one of the grooves 55 and holds its shaft from vertical displacement either upwardly or downwardly. Without it, gravity would cause its miller to descend in a mere awkward fall. On the other hand, if a rock or stump were struck in the field, the miller would yield and rise without performing any effective service. To hold it in a predetermined and effective working position, the lock, composed of pawl 64 and hand-wheel 65 as just described, is provided.

To prevent the possible wear on the several parts adjacent to the hand-wheel 65 if the miller strikes a rock or the like, a thrust collar bracket 66 is provided for each of the shafts 26, 46, and 47, in which the separate collars 67 and 68 are adapted to receive the jar.

It will be evident that usually to set the millers at the proper depth for work, hand-wheels 50, 51, and 52 will be used, but to retract them all from work and to tilt them into an inoperative position, raised above the ground so as not to strike inequalities, stumps, or loose objects on the ground, they, and the shafts 26, 46, and 47 bearing them, can be tilted at one time by operating hand-wheels 56. On the other hand, if, when set in the vertical position shown in the drawings, (particularly in Fig. 3) it is desired to give them a rakish tilt forward for greater cutting power of the millers, the hand-wheels 56 can be used to produce this auxiliary setting of the shafts 26, 46, and 47 and the millers borne thereby.

The shafts 36 are journaled in the boxes 32 forming part of the auxiliary supporting frame located within the main surrounding frame.

The bands 41 can be used simultaneously or separately, in which latter instance they will serve as steering apparatus, inasmuch as the pressure exerted upon one of the tractor wheels 3 by means of the drum 40 connected therewith, will tend to turn the machine as a whole toward that side, revolving on that resistance as a pivot.

Having thus described this invention, I hereby reserve the benefit of all changes in form, arrangement, order, or use of parts, as it is evident that many minor changes may be made therein without departing from the spirit of this invention or the scope of the following claims.

I claim:

1. The combination of a motor, a vertical miller shaft adapted to be actuated thereby, a cutter-head thereon, a drive shaft extending from the said motor, a sprocket-wheel thereon, a shaft and sprocket-wheel thereon adjacent said drive shaft, a sprocket-chain connecting the said sprockets, a worm wheel driven by the said last mentioned shaft, and a worm slidably keyed to the said miller shaft.

2. The combination of a motor, a vertical miller shaft adapted to be actuated thereby, a cutter-head thereon, a drive shaft extending from the said motor, a sprocket-wheel thereon, a shaft and sprocket-wheel thereon adjacent said drive shaft, a sprocket-chain connecting the said sprockets, a worm wheel driven by the said last mentioned shaft, a worm slidably keyed to the said miller shaft, and a universal joint between the said last-mentioned shaft and the said worm wheel.

3. The combination of a motor, a vertical miller shaft adapted to be actuated thereby, a cutter-head thereon, a drive shaft extending from the said motor, a sprocket-wheel thereon, a shaft and sprocket-wheel thereon adjacent said drive shaft, a sprocket-chain connecting the said sprockets, a worm wheel driven by the said last mentioned shaft, a worm slidably keyed to the said miller shaft, and means for raising and lowering the said miller shaft.

4. The combination of a motor, a vertical miller shaft adapted to be actuated thereby, a cutter-head thereon, a drive shaft extending from the said motor, a sprocket-wheel thereon, a shaft and sprocket-wheel thereon adjacent said drive shaft, a sprocket-chain connecting the said sprockets, a worm wheel driven by the said last mentioned shaft, a worm slidably keyed to the said miller shaft, and means for raising and lowering the said miller shaft, the said means consisting of grooves upon the said miller shaft, a pinion for engaging therewith and means for rotating the said pinion.

5. The combination of a motor, a vertical miller shaft adapted to be actuated thereby, a cutter-head thereon, a drive shaft extending from the said motor, a sprocket-wheel thereon, a shaft and sprocket-wheel thereon adjacent said drive shaft, a sprocket-chain connecting the said sprockets, a worm wheel driven by the said last mentioned shaft, a worm slidably keyed to the said miller shaft, and means for raising and lowering the said miller shaft, the said means consisting of grooves upon the said miller shaft, a pinion for engaging therewith and means for rotating the said pinion, there being a thrust collar adapted to absorb jar upon the said miller shaft.

6. The combination of a motor, a vertical miller shaft adapted to be actuated thereby, a cutter-head thereon, a drive shaft extending from the said motor, a sprocket-wheel thereon, a shaft and sprocket-wheel thereon adjacent said drive shaft, a sprocket-chain connecting the said sprockets, a worm wheel driven by the said last mentioned shaft, a worm slidably keyed to the said miller shaft, and means for raising and lowering the said miller shaft, the said means consisting of grooves upon the said miller shaft, a pinion for engaging therewith and means for rotating the said pinion, there being a thrust collar adapted to absorb jar upon the said miller shaft, a lock adapted to coöperate with the said grooves, the said thrust collar being located in conjunction with the said lock.

7. The combination of a motor, a vertical miller shaft adapted to be actuated thereby, a cutter-head thereon, a drive shaft extending from the said motor, a sprocket-wheel thereon, a shaft and sprocket-wheel thereon adjacent said drive shaft, a sprocket-chain connecting the said sprockets, a worm wheel driven by the said last-mentioned shaft, a worm slidably keyed to the said miller shaft, and means for raising and lowering the said miller shaft, the said means consisting of grooves upon the said miller shaft, a pinion for engaging therewith and means for rotating the said pinion, there being a thrust collar adapted to absorb jar upon the said miller shaft, a lock adapted to coöperate with the said grooves, the said thrust collar being located in conjunction with the said lock, the said lock consisting of a pawl adapted to fit into any one of the said grooves, and a hand-wheel for moving the said pawl into or out of engagement with the said grooves.

8. A machine of the character described comprising a substantially rectangular frame composed of angle-iron, channel beam, or the like, a cross-piece within the said frame and attached thereto, an auxiliary supporting frame extending from the said cross-piece to the forward part of the said main frame and supported by the said main frame and the said cross-piece, a motor borne by the said auxiliary frame, a miller or plurality of millers, means for driving the same from the said motor, a pair of tractor wheels and axle therefor journaled in the said main frame and means for driving the same from the said motor, the said means consisting of a shaft, a differential, the axle shafts of which are journaled in the said auxiliary frame, pinions mounted on the said axle shafts, and gears driven by the said pinions and in operative connection with the said tractor wheels, and means for driving the said miller consisting of a shaft having a worm-wheel at one end and a sprocket-wheel at the other, a sprocket connection with the said shaft, and a worm connection with the said miller.

9. In a machine of the character described, a unitary power plant, a unitary frame, traveling means journaled in the said frame, soil pulverizers supported by the said frame, means connected with the said power plant for driving the said soil pulverizers, means connected with the said power plant for locomotion of the machine as a whole, the said soil pulverizers being normally perpendicular to the earth, a pivoted arm connected to the said soil pulverizers, means for tilting the said soil pulverizers to any angle, the said means consisting of a plate in connection with the said soil pulverizers and a screw or screws connected with the said plate and screwthreadedly passing through the main frame of the machine.

10. In a machine of the character described the combination of a plurality of miller shafts, each of which is provided with a fixed cutter-head and a slidably connected gear, the said gears being in mesh so as to be operated from one certain gear, an arm mounted on a shaft bearing the said certain gear, a plate, or the like, attached to all the said miller shafts, a pivoted arm having holes in its extremities, through which holes the said miller shafts are adapted to pass, and a screw screwthreadedly passing through the main frame of the machine and the said plate attached to the said miller shafts.

11. In a machine of the character described the combination of a plurality of miller shafts, each of which is provided with a fixed cutter-head and a slidably connected gear, the said gears being in mesh so as to be operated from one certain gear; an arm mounted on a shaft bearing the said certain gear, a plate, or the like, attached to all the said miller shafts, a pivoted arm having holes in its extremities, through which holes the said miller shafts are adapted to pass, a screw screw threadedly passing through the main frame of the machine and the said plate attached to the said miller shafts, the said pivoted arm being provided at one end with a collar encircling the locomotion axle of the machine.

12. In a machine of the character described the combination of a plurality of miller shafts, each of which is provided with a fixed cutter-head and a slidably connected gear, the said gears being in mesh so as to be operated from one certain gear, an arm mounted on a shaft bearing the said certain gear, a plate, or the like, attached to all the said miller shafts, a pivoted arm having holes in its extremities, through which holes the said miller shafts are adapted to pass, a screw screwthreadedly passing through the main frame of the machine and the said plate attached to the said miller shafts, the said pivoted arm being provided at one end with a collar encircling the locomotion axle of the machine and at its other end being forked so as to extend toward the several miller shafts.

13. In a machine of the character described the combination of a plurality of miller shafts, each of which is provided with a fixed cutter-head and a slidably connected gear, the said gears being in mesh so as to be operated from one certain gear, an arm mounted on a shaft bearing the said certain gear, a plate, or the like, attached to all the said miller shafts, a pivoted arm having holes in its extremities, through which holes the said miller shafts are adapted to pass, a screw screwthreadedly passing through the main frame of the machine and the said plate attached to the said miller shafts, a pair of tractor wheels, an axle therefor, a motor and a plurality of means driven by the said single motor and adapted to actuate the said millers and also to drive the said tractor wheels.

14. In a machine of the character described the combination of a frame, tractor wheels, a motor, miller shafts having cutter-heads, means for elevating the said cutter-heads in a bank out of contact with the ground and means adapted individually to raise or lower the said cutter-heads.

In testimony whereof I hereunto affix my signature.

SLEEPER T. INGRAM.